US012784735B2

(12) United States Patent
Talwar et al.

(10) Patent No.: US 12,784,735 B2
(45) Date of Patent: Nov. 3, 2026

(54) VEHICLE-BASED SPEECH UNIT WITH HYBRID LANGUAGE DETECTION

(71) Applicant: GM GLOBAL TECHNOLOGY OPERATIONS LLC, Detroit, MI (US)

(72) Inventors: Gaurav Talwar, Novi, MI (US); Xu Fang Zhao, LaSalle (CA); Alaa M. Khamis, Courtice (CA); Prabhjot Kaur, Portland, OR (US); Kenneth R. Booker, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 127 days.

(21) Appl. No.: 18/889,481

(22) Filed: Sep. 19, 2024

(65) Prior Publication Data

US 2026/0080861 A1 Mar. 19, 2026

(51) Int. Cl.

*G10L 15/00* (2013.01)
*G06F 3/16* (2006.01)
*G10L 15/08* (2006.01)

(52) U.S. Cl.

CPC .............. *G10L 15/005* (2013.01); *G06F 3/16* (2013.01); *G10L 15/08* (2013.01)

(58) Field of Classification Search

CPC .......... G10L 15/005; G10L 15/08; G06F 3/16
See application file for complete search history.

(56) References Cited

U.S. PATENT DOCUMENTS 5,729,694 A * 3/1998 Holzrichter .......... G06Q 20/204 704/E15.041
10,418,026 B2 * 9/2019 Des Jardins .......... G10L 15/005
2008/0162146 A1 * 7/2008 Eckert ...................... G10L 15/22 704/E15.04
2012/0005187 A1 * 1/2012 Chavanne ............. G06F 16/958 707/711
2014/0108004 A1 * 4/2014 Sternby ................... G06F 3/018 704/9
2018/0197545 A1 * 7/2018 Willett .................. G10L 15/005
2019/0279613 A1 * 9/2019 Wheeler ................ G10L 15/16
2019/0347323 A1 11/2019 Riesa et al.

OTHER PUBLICATIONS

Choi, Lee, M.; Lee, S.; Toward a Multilingual Conversational Agent: Challenges and Expectations of Code-mixing Multilingual Users . In: Proceedings of the 2023 CHI conference on human factors in computing systems, 2023, S. 1-17.—ISSN 978-1-4503-9421-5.

* cited by examiner

*Primary Examiner* — Darioush Agahi
(74) *Attorney, Agent, or Firm* — Quinn IP Law

(57) ABSTRACT

A hybrid language identification (HLI) system includes one or more microphones configured to detect an acoustic utterance within an interior of a host system, a speaker operable for broadcasting a prompt or response within the interior of the host system, a processor, and memory. The processor executes a method that uses hybrid language detection logic stored in the memory to classify the acoustic utterance as a hybrid utterance having two or more languages, determine a relative language contribution of the languages, and command the speaker to broadcast the prompt or response within the interior. The prompt or response has the relative language contribution. The HLI system may be used as part of a vehicle having a vehicle body defining a vehicle interior, with the hybrid speech recognition occurring within the vehicle interior.

20 Claims, 5 Drawing Sheets

VEHICLE-BASED SPEECH UNIT WITH HYBRID LANGUAGE DETECTION

INTRODUCTION

Vehicles, homes, businesses, and other mobile or stationary host systems may be equipped with microphones, speakers, and voice recognition software to enable hands-free interaction with various applications and functions. For instance, a user of a suitably equipped vehicle may employ voice commands to interface with onboard vehicle systems. Using predetermined spoken words or phrases, the vehicle user may select or deselect infotainment, climate, or navigation system settings. The same user may request to listen to phone messages, place a phone call to a stored contact, etc. The use of voice commands prevents the user from having to remove their hands from a steering wheel or divert attention from the roadway and driving task. Voice-activated systems also exist for use in the user's home or office. Users of such systems may use voice commands in a similar manner, for example to request the playing of a particular song, movie, or television show, turn lights on or off, or command a desired temperature setting. Voice recognition capabilities thus improve the overall user experience in a myriad of mobile and stationary host systems.

SUMMARY

A hybrid language identification (HLI) system is disclosed herein for use in a host system. The automated solutions disclosed herein identify a spoken language of a user of the host system, for instance an operator or passenger of a vehicle, using (i) a natural language programming (NLP)-based approach, and (ii) an acoustic-based approach. The HLI system thereafter decides between predicted outputs of the NLP-based and acoustic-based results using a weighing or voting process, with the HLI system taking into consideration contextual information to identify the language mix or composition of the spoken language with a high degree of accuracy.

Embodiments of the HLI system include one or more microphones configured to detect an acoustic utterance within an interior of a host system, a speaker operable for broadcasting a prompt or response within the interior, a processor, and a non-transitory computer-readable storage medium ("memory"). Hybrid language detection logic is recorded on/in the memory. The processor uses the recorded hybrid language detection logic to classify the acoustic utterance as a hybrid of two or more primary languages, determine a relative language contribution of such languages, and command the speaker to broadcast the prompt or response within the interior of the host system. The prompt or response has the relative language contribution such that the user receives the prompt/response in the user's preferred hybrid language, e.g., 70% English and 30% Spanish.

The HLI system contemplated herein may determine the relative language contribution by selecting, from respective outputs of (i) a natural language programming (NLP) logic block and (ii) an acoustic-based logic block as alluded to above, an output having a higher corresponding confidence level relative to other possible outputs.

The HLI system in one or more embodiments includes or has access to a language setting. The HLI system in such embodiments is configured to automatically change the language setting based on the relative language contribution.

In some implementations, the HLI system is configured to classify the acoustic utterance at least in part by comparing the acoustic utterance to a plurality of pre-recorded voice/text prompts. The HLI system may also command the speaker to broadcast the prompt or response within the interior of the host system in accordance with a set of grammar, language composition, and prosody rules.

Aspects of the disclosure pertain to classifying the acoustic utterance as the hybrid utterance by generating quantized speech units or tokens in response to the acoustic utterance.

The HLI system may optionally display a color-coded heat map indicative of the relative language contribution of the two or more languages, via a display screen, and receive an electronic signal from the user via the display screen to select the relative language contribution.

Also disclosed herein is a vehicle having a vehicle body, a plurality of road wheels, and the above-summarized HLI system. One or more microphones are arranged in the vehicle interior and configured to detect an acoustic utterance. A speaker arranged in the vehicle interior is operable for broadcasting a prompt or response within the vehicle interior.

The present disclosure also includes a method for use aboard a voice-controllable host system, e.g., the above-summarized vehicle or another mobile or stationary host system. The method in accordance with an embodiment includes detecting an acoustic utterance within an interior of the host system using one or more microphones arranged in the interior, and broadcasting a prompt or response within the interior via a speaker. The method also includes using hybrid language detection logic of the HLI system to classify the acoustic utterance as a hybrid utterance having two or more languages, determine a relative language contribution of the two or more languages via the hybrid language detection logic, and command the speaker to broadcast the prompt or response within the interior of the host system, the prompt or response having the relative language contribution.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

Figure 1:
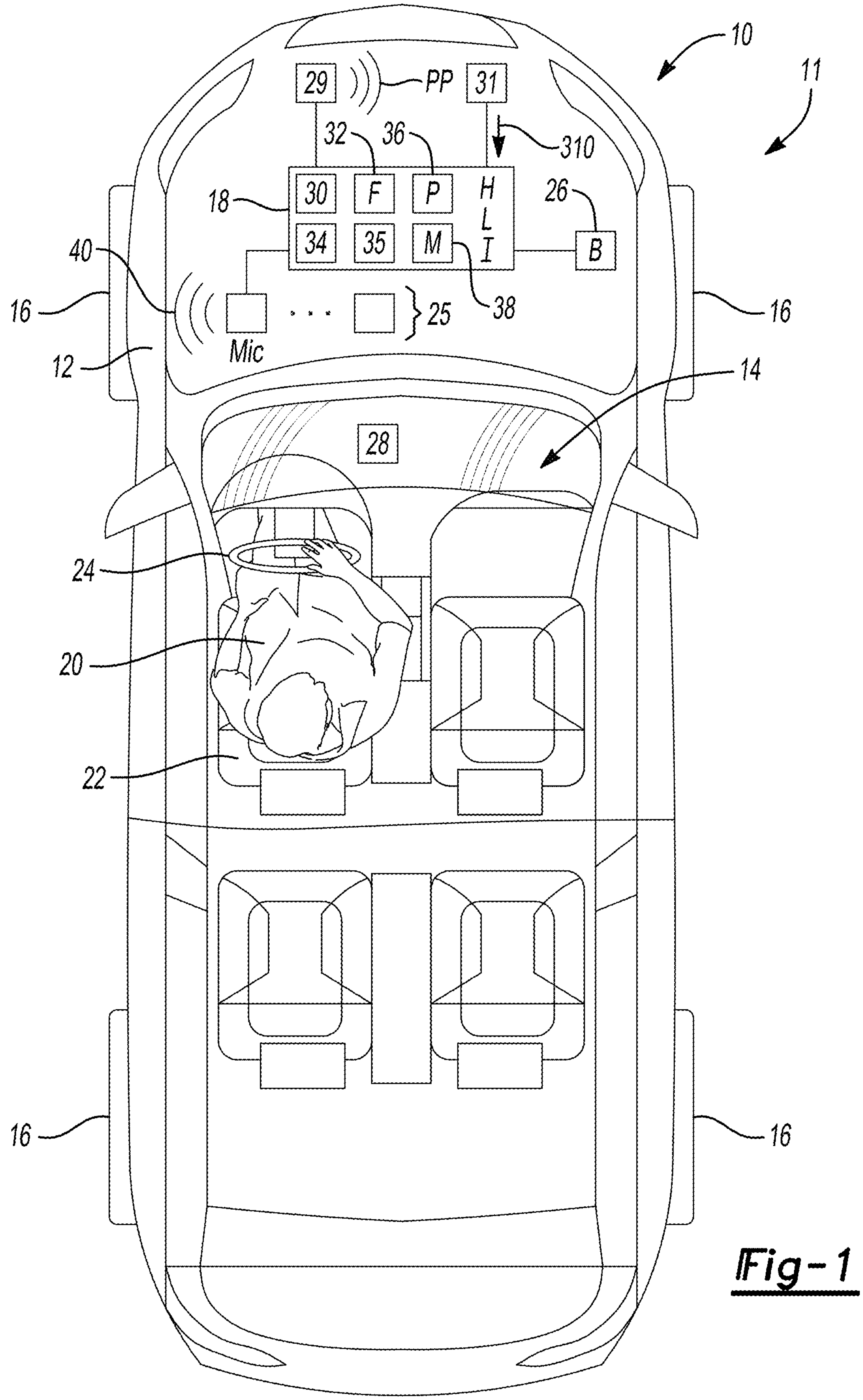
FIG. 1 is an illustration of a host system in the representative form of a vehicle having a hybrid language identification (HLI) system that is constructed as set forth herein.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

Referring to the drawings, wherein like reference numbers refer to like features throughout the several views, FIG. 1 illustrates a voice-controllable host system 10 in the form of a representative vehicle 11. In the illustrated embodiment, the vehicle 11 includes a vehicle body 12 defining a vehicle interior 14. The vehicle 11 may be variously embodied as a passenger vehicle having a set of road wheels 16 and one or more propulsion sources (not shown) such as an internal combustion engine and/or one or more electric traction motors. In other configurations, the vehicle 11 may be constructed as an aircraft, spacecraft, motorcycle, train/rail vehicle, boat/marine vessel, etc. In other constructions, the host system 10 may be a home, office, or another stationary environment, and therefore the disclosure is not limited to mobile systems in general or the vehicle 11 of FIG. 1 in particular.

The host system 10 as contemplated herein is voice-controllable, at least in part using a hybrid language identification (HLI) system 18 as described below with reference to FIGS. 2-5C. The host system 10 is "voice-controllable" in the sense that one or more onboard system functions are performed by or at the direction of the HLI system 18 in response to spoken commands or "acoustic utterances" of a user 20, in this case a driver or passenger of the vehicle 11. Exemplary system functions performed aboard the vehicle 11 may include, but are not necessarily limited to, placing phone calls, reading or sending text messages, controlling a climate setting of the vehicle interior 14, controlling a radio setting, and/or performing a desired navigation, infotainment, or other vehicle function, as appreciated in the art.

Within the vehicle interior 14 of the representative vehicle 11 of FIG. 1, integrated speech recognition software enables the use of voice commands to request various functions. Spoken language as contemplated herein may be one of two types: (i) a homogenous primary or "base" language such as English, Spanish, Chinese, Arabic, etc., or (ii) a user-specific/variable "hybrid" combination of two or more such base languages. Typically, a vehicle operating system is preprogrammed with a particular homogenous base language or is operable for identifying the base language when it is spoken, based on location, and/or using other determinants. Vehicles sold in the United States, for instance, may be programmed to receive spoken English commands and predetermined "wake words"from a defined English glossary. Alternative base languages such as Spanish may be selected by the user in some cases to enable the user to select their own user-preferred homogenous language from a list of language options. This is the typical implementation of speech recognition functions in a modern vehicular context.

Less typically, but nevertheless relatively commonplace, the user 20 may prefer to speak in a hybrid language. In certain regions of the United States, for instance, the user 20 may utter voice commands as a combination of English and Spanish, or so-called "Spanglish". Other common hybrid languages include Arabic and English ("Arabish") and Hindustani and English ("Hinglish"), with other hybrid language spoken in other areas of the world, including a hybrid French-English language in certain regions of Canada. Due to the hybrid nature of the utterances, the spoken languages do not conform to grammar and other conventions of the constituent homogenous base languages. This limitation renders the use of voice commands suboptimal for a given user speaking a hybrid language, perhaps requiring the user to repeat certain terms or phrases multiple times, or change their desired language patterns, until the system is able to recognize and respond to their spoken commands.

The technical solutions presented herein are intended to address this potential problem and improve overall user satisfaction and system responsiveness for users who prefer to speak a hybrid language. The HLI system 18 automatically adapts an audio and/or visual response to the personality/speech preferences of a given user 20, including responding in the user's preferred or demonstrated language structure. This may occur by determining a percentage composition of constituent base languages from a spoken acoustic utterance 40, e.g., in the form of a language heat map. Using a non-limiting hybrid English-Spanish example, the language heat map may correspond to detection of an utterance that is 70% English and 30% Spanish. As part of this approach, the HLI system 18 may broadcast prompts to the user 20 in a combination of two or more user-selected languages to detect the user's desired hybrid language, with the HLI system 18 thereafter responding with that particular language composition.

In lieu of traditional words or four-letter tokens, the present disclosure contemplates the use of quantized/numeric speech-unit tokens ("speech units"). Such speech units may be derived from user utterances and associated text embeddings to assist a large language model (LLM) in better comprehending and adapting appropriate grammar rules, and in establishing cross-lingual mapping and token relationships. Training and semantic enrichment of the LLM using the speech units may be more efficient, for instance by consuming reduced RAM, flash, and other memory, connectivity, and processing resources relative to word/letter-based alternatives. Based on a rudimentary glossary of the quantized tokens and an evolving glossary, possibly using the user's past speech history, a dynamic pool of text embeddings may be created to provide the user with suitable hybrid language prompts. Such prompts are closely aligned with the user's particular manner of speaking, as set forth herein.

The HLI system 18 of FIG. 1 also helps an associated large language model or edge controller to better comprehend and adapt to predetermined grammar rules of the constituent base languages, e.g., English and Spanish, and to establish cross-lingual mapping and speech unit relationships. Eventually, based on a glossary of such speech units and an evolving hybrid language glossary, a dynamic pool of text embeddings is created to provide hybrid language prompts to the user 20. In practical terms, the user 20 is able to speak a hybrid language and receive a hybrid response tailored the user's particular manner of speaking, e.g., 70% English/30% Spanish, 40% English/60% Spanish, etc.

SYSTEM COMPOSITION: In the illustrated representative implementation of FIG. 1, the HLI system 18 is configured to detect the spoken acoustic utterance 40 of the user 20, ascertain whether the acoustic utterance 40 conforms to a predetermined hybrid language such as English-Spanish, English-Arabic, or a hybrid of two or more other languages (not necessarily including English), and automatically respond in a manner that mimics the relative base language contribution of the detected hybrid language. While the user 20 may be a driver/operator of the example vehicle 11 as illustrated, other occupants of the vehicle 11 may be considered users within the scope of the disclosure.

The user 20 in the non-limiting embodiment of FIG. 1 is shown in a forward-facing position in a driver's seat 22, with the user 20 being seated behind a steering wheel 24. An array of one or more microphones 25 may be arranged within the vehicle interior 14. Each microphone 25 is configured to detect the acoustic utterance 40 (also see FIG. 5A) within the vehicle interior 14. That is, the microphones 25 detect audible speech of the user 20, either automatically or in response to depression of an activation button (B) 26 arranged somewhere in the vehicle interior 14, e.g., on the steering wheel 24 or a rearview mirror 28. Likewise, one or more speakers 29 may be arranged in the vehicle interior 14 and for broadcasting a prompt or response (PP) within the vehicle interior 14, or within the interior of another host system 10 in different implementations.

The HLI system 18 of FIG. 1, via a processor (P) 36 and associated memory (M) 38, is configured to use encoded or recorded hybrid language detection logic 35 (see FIG. 3) to classify the acoustic utterance 40 as a hybrid utterance, i.e., one having two or more languages. The HLI system 18 may be configured to classify the acoustic utterance 40 as a hybrid utterance by generating quantized speech units or tokens in response to the acoustic utterance, as set forth below. The HLI system 18 is also configured to determine a relative language contribution of the two or more languages, and to command the speaker(s) 29 to broadcast the prompt or response (PP) within an interior of the host system 10, e.g., within the vehicle interior 14 of the vehicle 11.

The prompt or response (PP) as contemplated herein has the relative language contribution, which in some embodiments may be displayed by the HLI system 18 as a color-coded language heat map via a display screen 31 of the host system 10. For instance, the HLI system 18 may be configured to display a color-coded language heat map indicative of the relative language contribution of the two or more languages, via a display screen 31, and to receive an electronic signal 310 via the display screen 31 to select or confirm the relative language contribution, for example in response to touch inputs to the display screen 31.

To that end, the HLI system 18 illustrated in FIG. 1 may be equipped with a speech recognition unit (SRU) 30 operable to detect, recognize, and act on the user's spoken utterance 40. The SRU 30 is in acoustic communication with the microphone(s) 25 to enable detection of spoken voice commands within the vehicle interior 14. Other components of the HLI system 18 may include a filtering block (F) 32 for reducing background road and cabin noise, and an analog-to-digital converter (ADC) 34 operable for transforming an analog acoustic waveform (the user's voice signal) into a digital signal suitable for further processing as set forth herein.

As described below with particular reference to FIG. 3, the recorded hybrid language detection logic 35 is used herein for performing feature extraction, by which key characteristics of a digitized speech signal from the ADC 34 are identified. The hybrid language detection logic 35 may also include an acoustic model for representing a relationship between the digital speech signal and associated linguistic speech units, one or more neural networks, e.g., a deep neural network (DNN), and/or a large language model (LLM) for associating the numeric speech units with a particular word or phrase constructed in a hybrid language reflecting or mirroring the hybrid speech composition of the user 20 shown in FIG. 1. The hybrid language detection logic 35 as contemplated herein is trained to detect patterns and relationships between phrases and constituent words of the speech units, as well as to recognize patterns and relationships between acoustic waveforms when the user 20 speaks the corresponding phrases and constituent words.

In general, the described functions of the HLI system 18 of FIG. 1 may be embodied as computer-readable instructions and executed from a computer-readable storage medium, i.e., the memory (M) 38, for instance magnetic or optical media, CD-ROM, and/or solid-state/semiconductor memory (e.g., various types of RAM or ROM). Hardware may be implemented as combinations of Application Specific Integrated Circuit(s) (ASIC), Field-Programmable Gate Array (FPGA), electronic circuit(s), central processing unit (s), i.e., the processor(s) (P) 36, and associated non-transitory components of the memory 38. Non-transitory components of the memory used herein are capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality.

Figure 2:
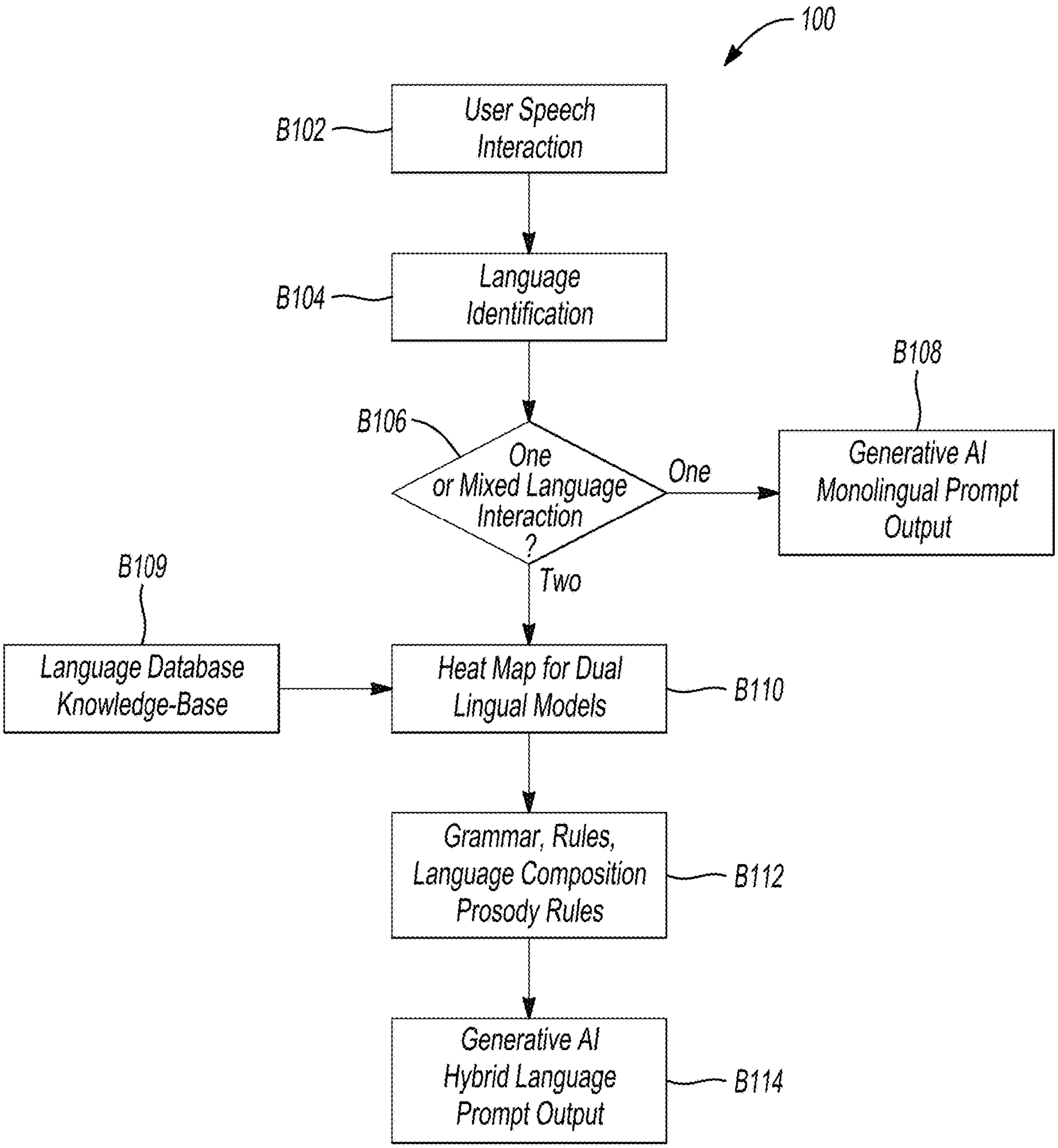
FIG. 2 is a flow chart illustrating a method for identifying a hybrid language when spoken within the host system of FIG. 1 and controlling a machine response in response thereto.

Referring to FIG. 2, a method 100 is performed by the processor 36 of the HLI system 18 shown in FIG. 1 to accommodate hybrid languages into the realm of spoken voice commands aboard the host system 10. FIG. 2 generally describes core functions as contemplated herein, with further details provided as set forth below and illustrated in FIGS. 3-5C. For illustrative clarity, the method 100 is described in terms of discrete logic segments or blocks each executable by the processor(s) of FIG. 1 to provide the described functionality. The described functions may be selected or deselected by the user 20 of FIG. 1, e.g., via the display screen 31, to allow the user 20 to grant permission to the HLI system 18 to access and possibly change language settings, e.g., in a Bluetooth™-connected device or a resident location of the host system 10. When the HLI system 18 includes or has access to the language setting, the HLI system 18 may automatically change the language setting and resulting hybrid prompts/responses (PP) based on the relative language contribution.

Beginning with block B102, the method 100 in accordance with a possible embodiment commences with the user utterance 40 and subsequent speech-based interaction with the HLI system 18. For instance, the user 20 may press the activation button 26 of FIG. 1 to cause the HLI system 18 to begin listening for the spoken acoustic utterance 40. Alternatively, the user 20 may engage in a conversation on cell phone or another Bluetooth™-connected device. In either case, the microphone(s) 25 shown in FIG. 1 detect the acoustic utterances 40 and commence processing of its acoustic waveform via the processor(s) 36, filter 32, and ADC 34. The method 100 thereafter proceeds to block B104.

At block B104, the HLI system 18 of FIG. 1 next classifies the processed acoustic utterance 40 using the hybrid language detection logic 35. As part of this process, the HLI system 18 may identify the relative language contribution of the two or more base languages, and command the speaker(s) 29 to broadcast the prompt or response (PP) within the interior of the host system 10, e.g., within the vehicle interior 14, such that the prompt or response (PP) has the same relative language contribution as spoken by the user 20.

Block B104 of FIG. 2 may entail using machine learning for this purpose, or an automated language identification (ALI) algorithm to analyze the acoustic properties and phonetic patterns of the associated acoustic waveform of the spoken utterances, including amplitude, frequency, inflections, pauses, etc.

As part of block B104, the HLI system 18 of FIG. 1 may break the acoustic waveform of the acoustic utterance 40 into its basic sound units or phonemes, and thereafter identify the spoken language(s) using such language indicators. The processor 36 may in one or more embodiments cause a bit flag to be recorded in memory 38 indicative of the number of detected base languages. In one or more embodiments, block B104 may proceed at least in part by comparing the acoustic utterance 40 to a plurality of pre-recorded voice/text prompts in different hybrid languages. The method 100 then proceeds to block B106.

At block B106, the HLI system 18 of FIG. 1 may determine if the detected language from block B104 is (i) a homogenous base language, in which case the method 100 proceeds to block B108, or (ii) a hybrid combination of two or more base languages, in which case the method 100 proceeds to block B110. Block B106 may be implemented in various ways, including by checking the value of the above-noted bit flag from block B104. The method 100 proceeds to block B108 once block B106 has been completed.

Block B108 of FIG. 2 includes generating a monolingual prompt output or otherwise responding to the spoken command aboard the host system 10 of FIG. 1. For example, using the exemplary case of English as the sole detected base language, the HLI system 18 may respond to a detected English command, e.g., "call home", by replying in the same language, such as by broadcasting the message "calling home" within the vehicle interior 14.

Block B109 includes opening a language database such as the above-noted LLM. Such a database may contain associated grammar rules, language composition rules, prosody rules, and other rules for a plurality of different languages, for example English, Spanish, German, French, Arabic, Chinese (Mandarin, Cantonese, etc.), etc. This information is thus made available to the processor 36 of FIG. 1 for performing subsequent steps of method 100 of FIG. 2. Ultimately, the HLI system 18 may command the speaker(s) 29 to broadcast the prompt or response PP within the interior of the host system 10 in accordance with the set of grammar, language composition, and prosody rules. The method 100 thereafter proceeds to block B110.

Block B110 of FIG. 2 is arrived at when a hybrid mix of two (or more) base languages are detected at block B106. Here, the HLI system 18 shown in FIG. 1 may generate a relative language contribution or "heat map" for use in determining or adapting appropriate dual-lingual models as set forth below. As contemplated herein, such a heat map, possibly color-coded and displayed via the display screen 31 or another screen, may entail a contribution or mix of dominant/primary and secondary base languages in the detected hybrid language. For an English-Spanish combination, for example, the heat map may represent 30% English/70% Spanish, or 90% English/10% Spanish, etc. As each speaker of a given hybrid language may be expected to have a different preference or regional dialect, block B110 is implemented to match the particular speech pattern of the user 20, thus personalizing the user's experience. The method 100 then proceeds to block B112.

At block B112, the processor 36 of FIG. 1 next accesses a set of rules for the identified languages. Rules as contemplated herein pertain to grammar, language composition, and prosody as noted above. Because each of the base languages used to form a hybrid language will tend to be associated with language-specific rules, block B112 may entail weighting the rules in accordance with the heat map from block B110. For instance, for a 30% English/70% Spanish example, the applied rules may more heavily favor a Spanish construction of generated prompts or responses, while a 70% English/30% Spanish utterance would favor an English construction with a reduced Spanish contribution, thus matching the manner and speech pattern of the user 20 of FIG. 1. The method 100 then proceeds to block B114.

Block B114 is analogous to block B108, and likewise entails generating a prompt output or otherwise responding to the spoken command aboard the vehicle of FIG. 1. In this case, however, the prompt/response is in the hybrid language matching the language composition of the heat map. Block B114 may entail accessing separate language glossaries, for instance English and Spanish in keeping with the non-limiting hybrid English-Spanish example. Using English as the detected language, for instance, the HLI system 18 may respond to a hybrid Spanish-English command, e.g., "call mi casa", which is more heavily weighted Spanish (two words) than English (one word), by replying in the same manner, such as by broadcasting a similarly constructed Spanglish response message "calling a tu casa". Thus, the particular hybrid speech of the user 20 of FIG. 1 is closely mirrored in the response. Generative AI techniques may be used as part of block B114, including but not limited to the LLM, neural networks, or both.

Figure 3:
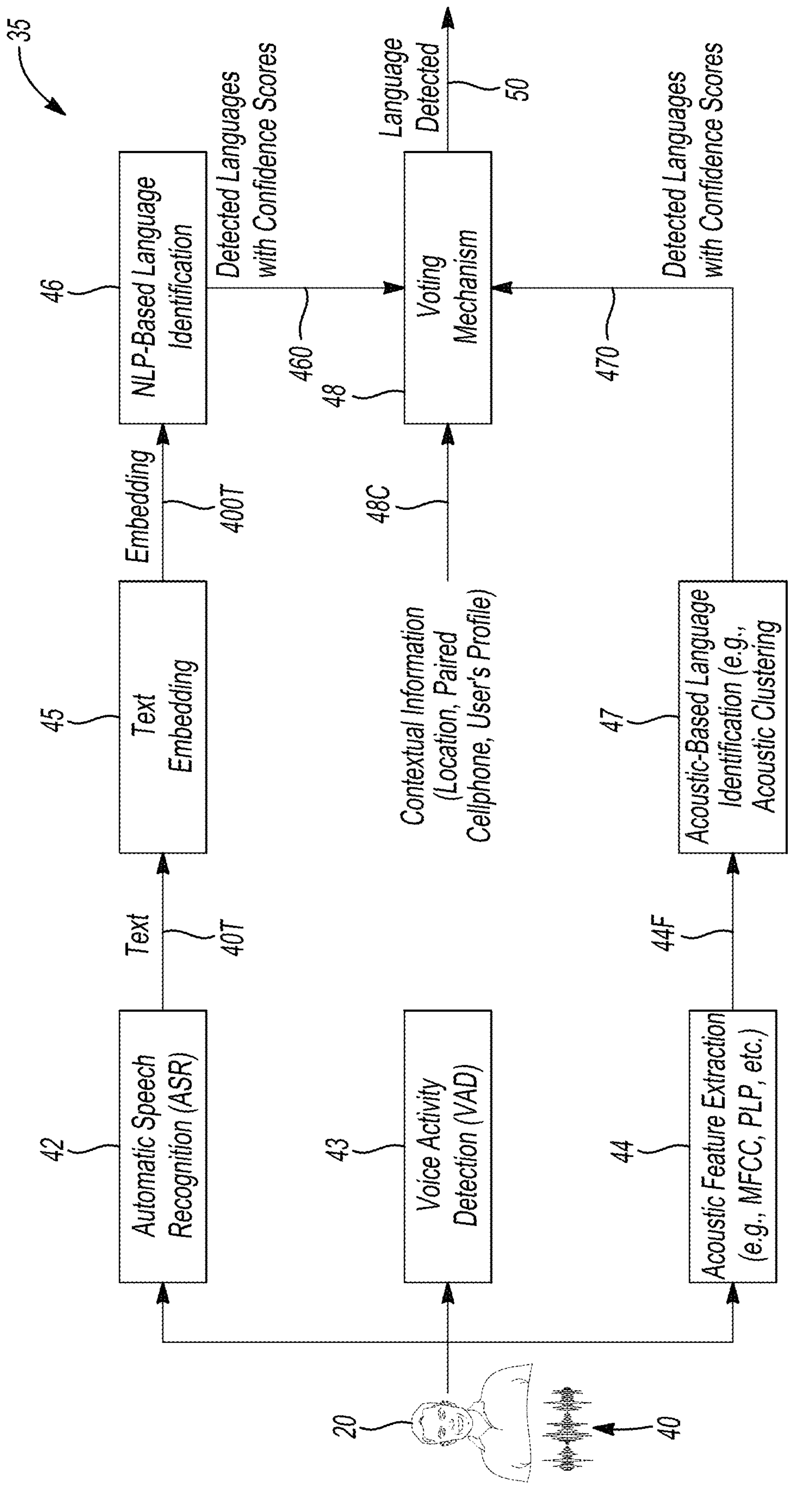
FIG. 3 is a process flow diagram illustrating the general operation of an HLI system usable aboard the host system of FIG. 1 as part of the representative method of FIG. 2.

Referring to FIG. 3, a general process flow for implementing the above-noted hybrid language detection logic 35 is described in conjunction with associated hardware "modules". As used herein, the hardware modules may be implemented as combinations of programmed code/logic, processing nodes, and non-transitory and transitory memory suitable for performing a designated portion of the above-described method 100.

In accordance with a representative embodiment, the user 20 of the host system 10 shown in FIG. 1, e.g., a driver or passenger ("occupant") of the vehicle 11, may press the activation button 26 to initiate a verbal command sequence, as appreciated in the art. In the non-limiting example of the vehicle 11, the activation button 26 may be mounted to the steering wheel 24, the rearview mirror 28, or another user-accessible location. The acoustic utterance 40 is then detected by the microphone(s) 25 of FIG. 1 and relayed to one or more downstream modules, in this example including an Automatic Speech Recognition (ASR) module 42, a Voice Activity Detection (VAD) module 43, and an Acoustic Feature Extraction (AFE) module 44.

The ASR module 42 of FIG. 3 may be implemented as a Machine Learning (ML) or Artificial Intelligence (AI) processing node operable to process the acoustic utterance 40, possibly convert the acoustic utterance 40 into a digital signal, and transform the digitized waveform of the acoustic utterance 40 into machine-readable text strings. Various approaches may be used to encode the ASR module 42, e.g., Gaussian Mixture Models, Hidden Markov Models, or another suitable combination of lexicon models (phonetic pronunciation), acoustic models (acoustic patterns to predict sounds or phonemes for each speech segment), and a large language model for prediction of word sequences. The output of the LMM of the ASR module 42 is then decoded into a text transcript. Other possible implementations of the ASR module 42 may include deep learning techniques such as an End-to-End Deep Learning Model. Regardless of the implementation, the ASR module 42 generates text 40T as its output.

The VAD module 43 of FIG. 3, as the name implies, is operable for detecting and distinguishing speech from silence and ambient background noise, for example engine or road noise in the exemplary vehicle 11 embodiment of FIG. 1. For the purposes of the method 100, the VAD module 43 may be configured to identify parts of the waveform of the acoustic utterance 40 to feed into the ASR module 42. Eliminating silence and ambient noise thus reduces computational power and allows the ASR module 42 to focus on speech-related portions of detected acoustic signals. Thus, in different embodiments the HLI system 18 of FIG. 1 may automatically detect speech of the user 20 based on a wake word/phrase, or the HLI system 18 may respond to depression of the activation button 26.

With respect to the AFE module 44 of FIG. 3, this component modifies the digitized waveform of the acoustic utterance 40 into a parametric representation of the audio spectrum, such as a sonograph or voiceprint, that may help minimize the amount/rate of data needed for further downstream processing. Non-limiting example implementations of the AFE module 44 may include Mel Frequency Cepstral Coefficients (MFCC), Perceptual Linear Prediction (PLP), Linear Prediction Coefficients (LPC), Line Spectral Frequencies (LSF), etc. The AFE module 44 thus outputs a non-text acoustic feature set 44F.

Still referring to FIG. 3, the ASR module 42 outputs the text 40T to a Text Embedding (TE) module 45 for further processing. The TE module 45 is operable for generating a compressed representation of the acoustic utterance 40 for further classification, e.g., as a vector having a fixed size. The embedded text 400T is then output to an NLP-based Language Identification (NLPI) module 46 for further processing in the text domain.

The NLPI module 46 of FIG. 3 for its part is operable for detecting the spoken language(s) based on the embedded text 400T, doing so with an associated confidence score, e.g., ranging from 0 for "no confidence" to 100 for "100% confidence". The NLPI Module 46 operates by recognizing text strings and their associated meaning, in particular associated functions aboard the vehicle 11 or other host system 10. Approaches such as deep neural networks (DNNs), LLMs or other language models, may be used to ascertain a detected language with a corresponding confidence score. The detected language and confidence score are then communicated as a predicted output 460 to a Voting Module (VM) 48 having the functionality explained below.

Similar in some respects to the function of the NLPI module 46, the HLI system 18 of FIG. 1 also employs an Acoustic-based Language Identification (ALI) module 47 as part of its architecture. The ALI module 47 may use the features 44F from AFE module 44 to generate short strings or clusters of data, and a diarization module to identify language boundaries between base language. Diarization as contemplated herein refers to breaking down the acoustic features 44F of a given audio recording, e.g., the acoustic utterance 40, into discrete speech segments. Various diarization toolkits may be used for this purpose, including those using open source deep learning models such as pyannote. audio or Kaldi, or the above-noted DNNs, LLMs, or other language models.

The ALI module 47 of FIG. 3 may utilize acoustic clustering as a possible approach. As appreciated in the art, acoustic clustering involves the grouping together of acoustically similar features, in this case the features 44F from the AFE module 44. Data from the collective clusters is then used by the HLI system 18 of FIG. 1 to detect the spoken language and assign a confidence score, e.g., 0-100 as noted above for the NLPI module 46.

The VM 48 is programmed to decide between the predicted output 460 of the NLPI module 46 and acoustic-based results from the ALI module 47, e.g., using a weighing or voting process. Such a process may also take into consideration contextual information 48C to identify the composition of the spoken language with a high degree of accuracy. Contextual information 48C may include the location of the host system 10, language settings or preferences from paired cellphones or other devices, a prior-recorded user profile, etc. For instance, if the user 20 of FIG. 1 previously selected a 70%/30% English/Spanish contribution, this stated hybrid composition preference may be weighted more heavily than the predicted outputs 460 and 470 in choosing a detected language 50.

In an illustrative voting example, the predicted output 460 from the NLPI module 46 may be 70%/30% English/Spanish with 90% confidence, while the predicted output 470 from the ALI module 47 may be 50% English/50% Spanish with 75% confidence. The contextual information 48C may predict 80%/20% English/Spanish with 80% confidence. Using the three values, the VM 48 may apply a predetermined formula to determine the composition, such as a straight average. For English, for instance, this may be determined as [(70)(0.9)+(50)(0.75)+(80)(0.8)]/3=55% English. The formula may be weighted in a particular manner, e.g., with twice as much weight given to the predicted output 460 from the NLPI module 46 of FIG. 3. In that case, the above formula would change to [2(70)(0.9)+(50)(0.75)+(80)(0.8)]/3=75.8% English. Or, the VM 48 could simply select the highest confidence score, in this case 80% English/20% Spanish from the contextual information 48C in keeping with this non-limiting example.

Figure 4:
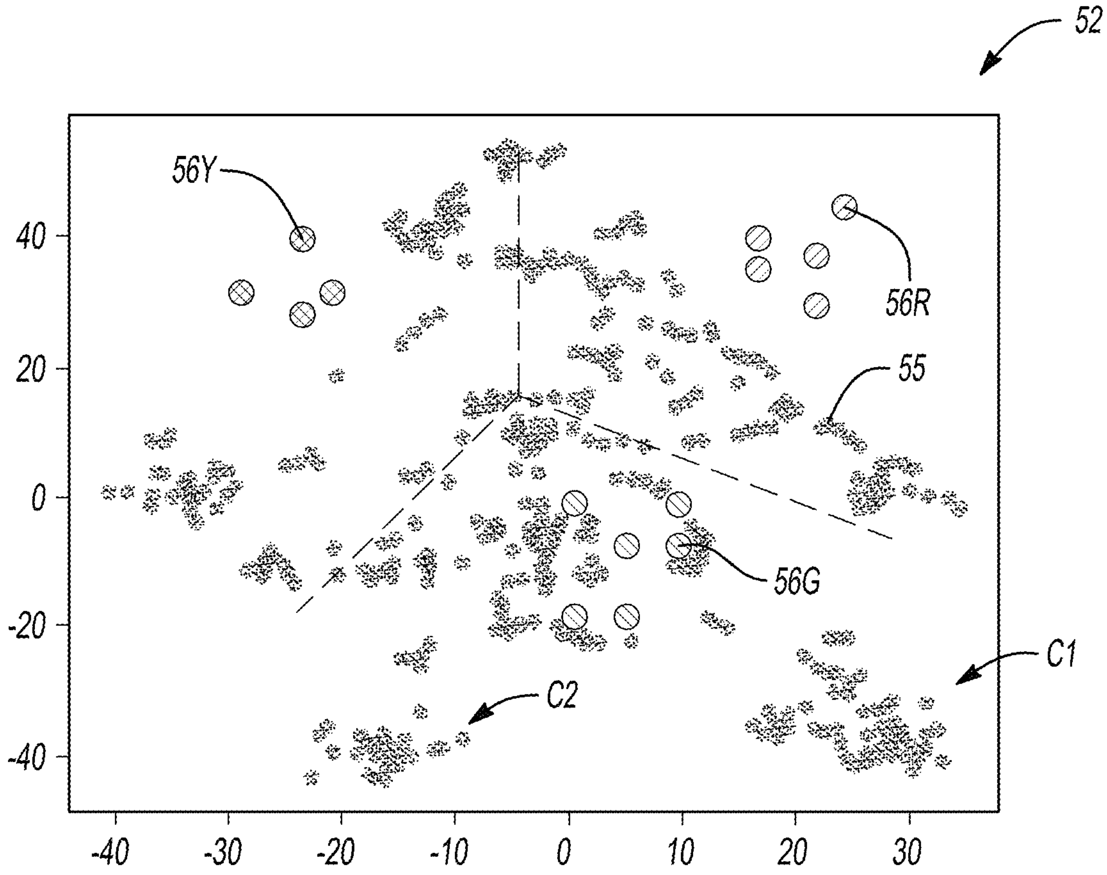
FIG. 4 is a scatter plot of a multi-dimensional feature space illustrating multi-lingual text embeddings and quantized speech units usable as part of the method of FIG. 2.

Referring briefly to FIG. 4, a scatter plot 52 is provided of a representative multidimensional feature space. The scatter plot 52 illustrates an example set of multi-lingual text embeddings and quantized speech units 53 (see FIG. 5A). Points 55 indicate a typical text modality in which clusters, e.g., C1 and C2, correspond to different commanded functions of the vehicle 11. Points 56G, 56R, and 56Y indicate a particular speech-based modality, with the higher densities of points 55 relative to points 56G, 56Y, and 56R illustrating the lower memory and processing load enabled by use of the quantized speech units 53. Data clusters are thus formed from both modalities, e.g., the points 56R at [30, 40] may collectively represent a particular feature such as placing a phone call. The clustered data of the scatter plot 52 may be created and adapted dynamically in response to hybrid language detection as described herein, which ultimately trains the underlying LLM or other models of the HLI system 18 and thus allows the HLI system 18 of FIG. 1 to adapt to the natural hybrid speech patterns of the user 20 of FIG. 1.

Referring once again to FIG. 3, the VM 48 represents a downstream processing block operable for making a final determination as to the particular language or languages of the spoken acoustic utterance 40. The VM 48 may compare the outputs and corresponding confidence scores from the NLPI module 46 and the ALI module 47 and select the higher confidence score in one or more embodiments. For example, if the NLPI module 46 determines with 70% confidence that the detected languages are English and Spanish, and the ALI module 47 determines with 40% confidence that the language is English alone, the VM 48 may record a bit code indicative of the languages being English and Spanish. The VM 48 may consider the additional contextual information 48C as noted above to better inform its voting judgment and predictive accuracy. The various factors are thereafter weighed in determining the spoken hybrid language, i.e., the detected language 50.

Figures 5A, 5B, 5C:
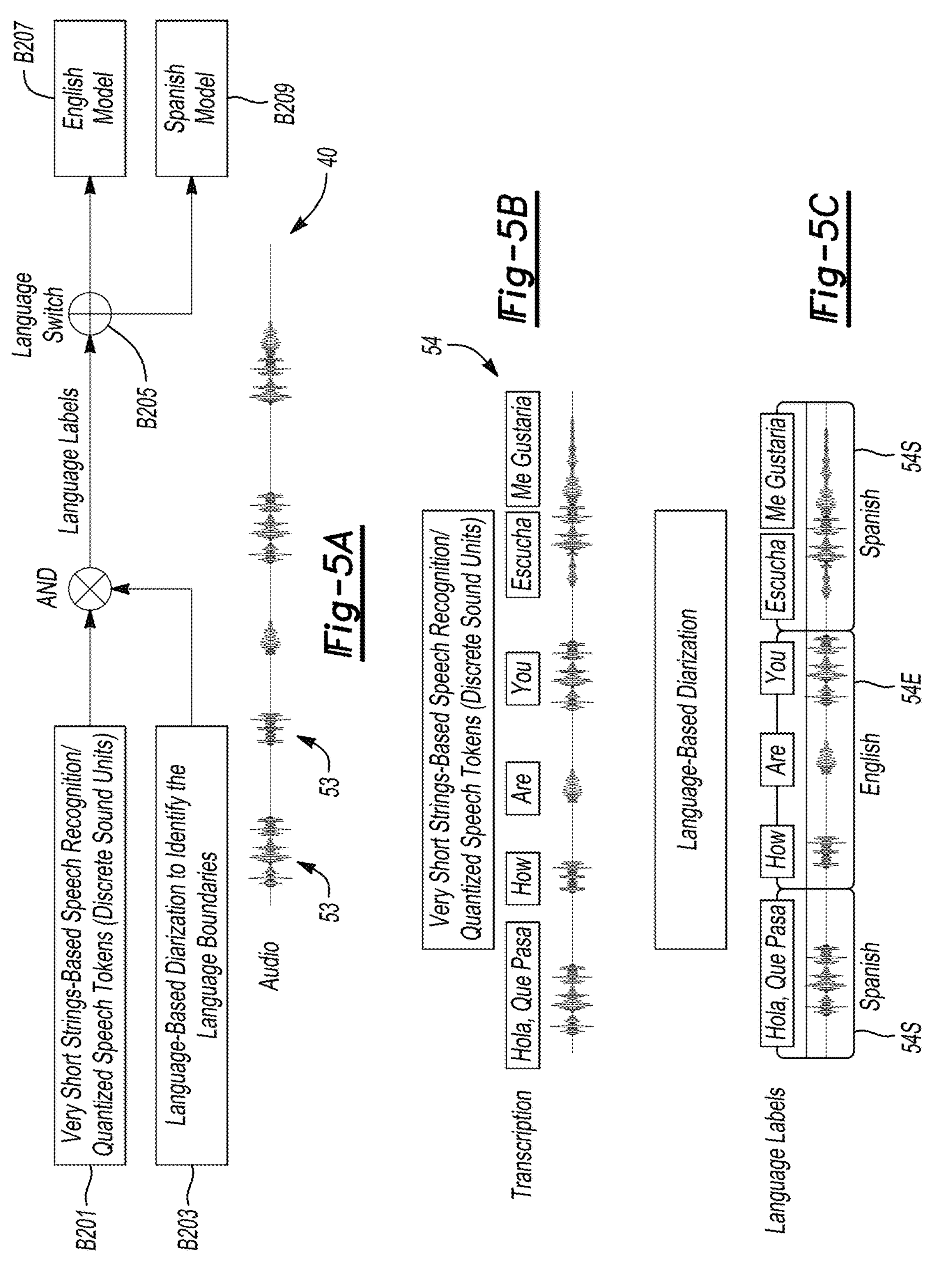
FIGS. 5A, 5B, and 5C collectively describe aspects of the method shown in FIG. 2.

Implementation of block B104 is illustrated as a simplified example in FIGS. 5A, 5B, and 5C. In block B201 of FIG. 5A, in response to the spoken utterance 40, the HLI system 18 may generate quantized tokens or speech units. At the same time in block B203, the HLI system 18 of FIG. 1 performs a language-based diarization process to identify language boundaries between the different languages, i.e., points in time where the user 20 stops speaking one base language, stops, and starts speaking another. The outputs of blocks B201 and B203 are combined, with the HLI system 18 applying respective Spanish or English language labels 54S, 54E (FIG. 5C). A downstream language switch B205 may then detect the language using the language label 54S or 54E (for the non-limiting case of English and Spanish), and thereafter apply grammar and other rules in accordance with a corresponding model, e.g., English at block B207 and Spanish at block B209.

As shown in FIG. 5B, consider an example speech-to-text Spanglish transcription "Hola, qué pasa? How are you? Escucha me gustaria . . . ", followed by a request (not shown).

In this example, speech units 53 separately correspond to "Hola, qué pasa?", "how", "are", "you", "escucha", and "me gustaria", which collectively form the acoustic utterance 40. Text embedding, represented by corresponding text language labels 54, may occur via the TE module 45 of FIG. 3. Using language-based diarization as shown in FIG. 5C, each speech unit 53 with associated language labels is then associated with a base language, in this exemplary case Spanish or English. The initial acoustic utterance 40 is a continuous signal, which is then discretized herein into smaller segments of quantized speech, e.g., a bit pattern or string. To lower the overall memory requirements, such quantized speech may be represented as a particular sequence of numbers for a given word or phrase.

Among other benefits, the present teachings enable the HLI system 18 of FIG. 1 to play or show prerecorded mixed language prompts in a dynamic sequence based on machine learning based on a user's particular mix of a dominant primary language and a secondary language. Grammar rules and token mixes for generative AI may follow the same order. As the solutions may be user-selected in response to playing of different prerecorded multi-lingual prompts, the described solutions allow a user 20 having limited literacy and/or a visual impairment to enjoy the customized response of the HLI system 18.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A hybrid language identification (HLI) system comprising:

one or more microphones configured to detect a hybrid acoustic utterance comprising a combination of two or more languages, within an interior of a host system;

a speaker operable for broadcasting a hybrid prompt or response within the interior of the host system;

a processor;

a filter for reducing background acoustic noise within the interior of the host system;

an analog-to-digital convertor (ADC) operable for transforming the hybrid acoustic utterance into a digital speech signal; and a non-transitory computer-readable storage medium ("memory") on which is recorded hybrid language detection logic, wherein the processor is configured to use the hybrid language detection logic to classify the hybrid acoustic utterance as a hybrid utterance having the combination of two or more languages, determine a relative language contribution of the combination of two or more languages, and command the speaker to broadcast the hybrid prompt or response within the interior of the host system, the hybrid prompt or response having the relative language contribution; and wherein the HLI system is configured to be activated by (i) depressing an activation button, or by (ii) the HLI system automatically detecting a spoken activation word or phrase;

wherein the HLI system is configured to determine the relative language contribution of the combination of two or more languages by selecting, from respective outputs of (i) a natural language programming (NLP) logic block and (ii) an acoustic-based logic block, an output having a higher corresponding confidence level;

wherein the HLI system includes, or has access to, a language setting; and wherein the HLI system is configured to automatically change the language setting based on the relative language contribution of the combination of two or more languages.

2. The HLI system of claim 1, wherein the HLI system is configured to use machine learning to analyze one or more acoustic properties and one or more phonetic patterns of an acoustic waveform of the hybrid acoustic utterance;

wherein the hybrid language detection logic comprises an acoustic model configured to represent a relationship between the digital speech signal and one or more associated linguistic speech units; and wherein the acoustic model is configured to use a deep neural network (DNN) and/or a large language model (LLM).

3. The HLI system of claim 1, wherein the HLI system further comprises: an automatic speech recognition (ASR) module, a voice activity detection (VAD) module, and an acoustic feature extraction (AFE) module.

4. The HLI system of claim 3, wherein the ASR module is configured as a machine learning (ML) or an artificial intelligence (AI) processing node operable to (i) convert the hybrid acoustic utterance into the digital speech signal, and then (ii) transform the digital speech signal into one or more machine-readable text strings using a Gaussian mixture model or a Markov model.

5. The HLI system of claim 3, wherein the VAD module is configured to detect and distinguish the hybrid acoustic utterance from silence and ambient background noise; and wherein the AFE module is configured to modify the digital speech signal of the hybrid acoustic utterance into an audio spectral sonograph or voiceprint using a Mel Frequency Cepstral Coefficients (MFCC) model, a Perceptual Linear Prediction (PLP) model, a Linear Prediction Coefficients (LPC) model, or a Line Spectral Frequencies (LSF) model.

6. A vehicle comprising:

a vehicle body defining a vehicle interior;

a plurality of road wheels; and a hybrid language identification (HLI) system, wherein the plurality of road wheels and the HLI system are connected to the vehicle body, the HLI system comprising:

one or more microphones arranged in the vehicle interior and configured to detect a hybrid acoustic utterance comprising a combination of two or more languages of a user of the vehicle;

a speaker arranged in the vehicle interior and operable for broadcasting a hybrid prompt or response therewithin;

a processor;

a filter for reducing background acoustic noise within the vehicle interior;

an analog-to-digital convertor (ADC) operable for transforming the hybrid acoustic utterance into a digital speech signal; and a non-transitory computer-readable storage medium ("memory") on which is recorded hybrid language detection logic, wherein the processor is configured to use the hybrid language detection logic to classify the hybrid acoustic utterance as a hybrid utterance having the combination of two or more languages, determine a relative language contribution of the combination of two or more languages, and command the speaker to broadcast the hybrid prompt or response within the interior of the vehicle, the hybrid prompt or response having the relative language contribution; and wherein the HLI system is configured to be activated by (i) depressing an activation button located on a steering wheel or a rearview window of the vehicle, or by (ii) the HLI system automatically detecting a spoken activation word or phrase;

wherein the HLI system is configured to determine the relative language contribution of the combination of two or more languages by selecting, from respective outputs of (i) a natural language programming (NLP) logic block and (ii) an acoustic-based logic block, an output having a higher corresponding confidence level;

wherein the HLI system includes, or has access to, a language setting; and wherein the HLI system is configured to automatically change the language setting based on the relative language contribution of the combination of two or more languages.

7. The vehicle of claim 6, wherein the HLI system is configured to use machine learning to analyze one or more acoustic properties and one or more phonetic patterns of an acoustic waveform of the hybrid acoustic utterance;

wherein the hybrid language detection logic comprises an acoustic model configured to represent a relationship between the digital speech signal and one or more associated linguistic speech units; and wherein the acoustic model is configured to use a deep neural network (DNN) and/or a large language model (LLM).

8. The vehicle of claim 6, wherein the HLI system further comprises: an automatic speech recognition (ASR) module, a voice activity detection (VAD) module, and an acoustic feature extraction (AFE) module.

9. The vehicle of claim 8, wherein the ASR module is configured as a machine learning (ML) or an artificial intelligence (AI) processing node operable to (i) convert the hybrid acoustic utterance into the digital speech signal, and then (ii) transform the digital speech signal into one or more machine-readable text strings using a Gaussian mixture model or a Markov model.

10. The vehicle of claim 8, wherein the VAD module is configured to detect and distinguish the hybrid acoustic utterance from silence and ambient background noise; and wherein the AFE module is configured to modify the digital speech signal of the hybrid acoustic utterance into an audio spectral sonograph or voiceprint using a Mel Frequency Cepstral Coefficients (MFCC) model, a Perceptual Linear Prediction (PLP) model, a Linear Prediction Coefficients (LPC) model, or a Line Spectral Frequencies (LSF) model.

11. A method for use aboard a voice-controllable host system, the method comprising:

activating the voice-controllable host system by (i) depressing an activation button, or by (ii) automatically detecting a spoken activation word or phrase;

detecting a hybrid acoustic utterance within an interior of the voice-controllable host system using one or more microphones arranged in the interior;

reducing background acoustic noise within the interior using a filter;

transforming the hybrid acoustic utterance into a digital speech signal using an analog-to-digital convertor (ADC);

broadcasting a hybrid prompt or response within the interior of the voice-controllable host system via a speaker;

using hybrid language detection logic of a hybrid language identification (HLI) system to classify the hybrid acoustic utterance as a hybrid utterance having a combination of two or more languages;

determining a relative language contribution of the combination of two or more languages via the hybrid language detection logic;

commanding the speaker to broadcast the hybrid prompt or response within the interior of the voice-controllable host system, the hybrid prompt or response having the relative language contribution; and determining the relative language contribution of the combination of two or more languages by selecting, from respective outputs of (i) a natural language programming (NLP) logic block and (ii) an acoustic-based logic block, an output having a higher corresponding confidence level; and automatically changing a language setting of the HLI system based on the relative language contribution.

12. The method of claim 11, further comprising: classifying the hybrid acoustic utterance at least in part by comparing the hybrid acoustic utterance to a plurality of pre-recorded voice/text prompts.

13. The method of claim 11, further comprising: commanding the speaker to broadcast the hybrid prompt or response within the interior of the voice-controllable host system, via the HLI system, in accordance with a set of grammar, language composition, and prosody rules.

14. The method of claim 11, further comprising:

presenting a color-coded heat map via a display screen located in the interior of the voice-controllable host system, the color-coded heat map being indicative of the relative language contribution of the combination of two or more languages; and receiving an electronic signal from the display screen to select or confirm the relative language contribution.

15. The method of claim 11, wherein the HLI system is configured to use machine learning to analyze one or more acoustic properties and one or more phonetic patterns of an acoustic waveform of the hybrid acoustic utterance;

wherein using the hybrid language detection logic comprises using an acoustic model to represent a relationship between the digital speech signal and one or more associated linguistic speech units; and wherein using the acoustic model comprises using a deep neural network (DNN) and/or a large language model (LLM).

16. The method of claim 11, wherein the voice-controllable host system comprises a vehicle including a vehicle body defining a vehicle interior, and including a plurality of road wheels connected to the vehicle body.

17. The method of claim 11, further comprising: (i) performing automatic speech recognition (ASR), (ii) performing voice activity detection (VAD), and (iii) performing acoustic feature extraction (AFE) of the hybrid acoustic utterance.

18. The method of claim 17, wherein performing ASR comprises using machine learning (ML) or artificial intelligence (AI) processing to (i) convert the hybrid acoustic utterance into the digital speech signal, and then (ii) transform the digital speech signal into one or more machine-readable text strings using a Gaussian mixture model or a Markov model.

19. The method of claim 17, wherein performing VAD comprises detecting and distinguishing the hybrid acoustic utterance from silence and ambient background noise within the interior.

20. The method of claim 17, wherein performing AFE comprises modifying the digital speech signal of the hybrid acoustic utterance into an audio spectral sonograph or voiceprint by using one or more of: a Mel Frequency Cepstral Coefficients (MFCC) model, a Perceptual Linear Prediction (PLP) model, a Linear Prediction Coefficients (LPC) model, or a Line Spectral Frequencies (LSF) model.

* * * * *